(12) United States Patent
Siedler

(10) Patent No.: US 9,050,571 B2
(45) Date of Patent: Jun. 9, 2015

(54) APPARATUS FOR A RADIAL-FLOW REACTOR AND METHOD FOR ASSEMBLY THEREOF

(71) Applicant: UOP LLC, Des Plaines, IL (US)

(72) Inventor: Nathan Siedler, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 210 days.

(21) Appl. No.: 13/852,596

(22) Filed: Mar. 28, 2013

(65) Prior Publication Data

US 2014/0294683 A1    Oct. 2, 2014

(51) Int. Cl.
  *B01J 8/00*    (2006.01)
  *B01J 8/02*    (2006.01)
  *B01J 19/00*   (2006.01)
  *F16L 3/00*    (2006.01)
  *F16L 3/02*    (2006.01)

(52) U.S. Cl.
  CPC ...... *B01J 8/0214* (2013.01); *B01J 2208/00884* (2013.01)

(58) Field of Classification Search
  CPC .............. B01J 8/00; B01J 8/0015; B01J 8/02; B01J 8/0207; B01J 8/0214; B01J 19/00; B01J 19/0053; B01J 2208/00; B01J 2208/00743; B01J 2208/00752; B01J 2208/00761; B01J 2208/00769; B01J 2208/00796; B01J 2208/00884; F16L 3/00; F16L 3/02; F16L 3/04; F16L 3/08; F16L 3/085; F16L 3/10; F16L 3/1008; F16L 3/1016; F16L 3/1025; F16L 3/1033; F16L 3/1041; F16L 3/105; F16L 3/1058; F16L 3/1066; F16L 3/1075; F16L 3/1083; F16L 3/1091

USPC .......................................... 422/129, 187, 211
See application file for complete search history.

(56) References Cited

U.S. PATENT DOCUMENTS

| | | | |
|---|---|---|---|
| 2,886,517 A * | 5/1959 | Patton et al. | ................... 208/134 |
| 3,647,680 A | 3/1972 | Greenwood | |
| 3,692,496 A | 9/1972 | Greenwood | |
| 3,706,536 A | 12/1972 | Greenwood | |
| 4,421,723 A | 12/1983 | Farnham | |
| 4,702,645 A * | 10/1987 | Skinner et al. | ............. 405/184.2 |
| 5,130,106 A | 7/1992 | Koves | |
| 7,776,293 B2 | 8/2010 | Downs et al. | |
| 2004/0245778 A1 | 12/2004 | Adams | |

FOREIGN PATENT DOCUMENTS

| | | |
|---|---|---|
| EP | 0483975 A1 | 5/1992 |
| KR | 1020100047247 A | 5/2010 |
| WO | 2004113777 A2 | 12/2004 |

OTHER PUBLICATIONS

U.S. Appl. No. 13/852,640 (Siedler), filed Mar. 28, 2013.
U.S. Appl. No. 13/852,687 (Siedler), filed Mar. 28, 2013.
U.S. Appl. No. 13/852,771 (Siedler), filed Mar. 28, 2013.
PCT International Search Report for PCT/US2014/031675, mailing date Jul. 28, 2014.

* cited by examiner

*Primary Examiner* — Natasha Young

(57) ABSTRACT

An apparatus for a radial-flow reactor according to various approaches includes a catalyst transfer pipe having an inwardly tapered end portion. According to various approaches, a catalyst transfer port of the reactor may include a centering device having an upper tapered surface for facilitating assembly of the reactor. A method according to various aspects includes assembling a radial-flow reactor by installing a catalyst transfer pipe through a catalyst transfer port.

17 Claims, 3 Drawing Sheets

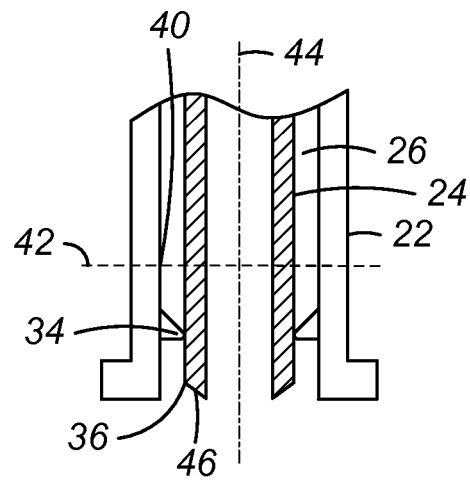 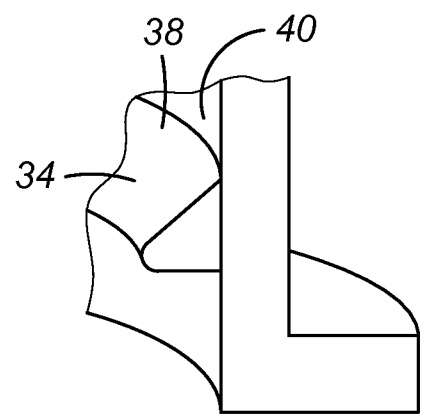
FIG. 3  FIG. 4
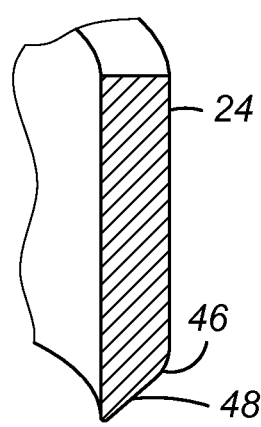 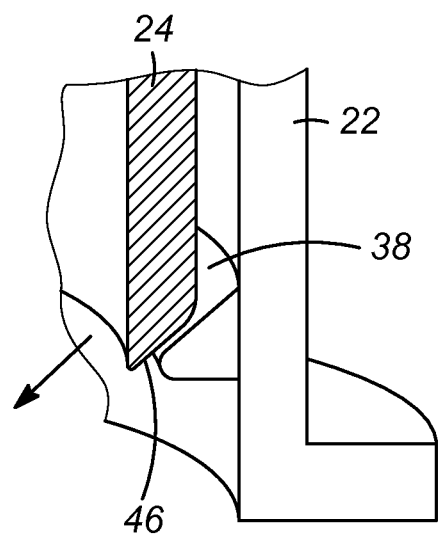
FIG. 5  FIG. 6

APPARATUS FOR A RADIAL-FLOW REACTOR AND METHOD FOR ASSEMBLY THEREOF

FIELD OF THE INVENTION

The subject invention relates to an apparatus for a radial-flow reactor and a method for assembling a radial-flow reactor. More specifically, the invention relates to a method and apparatus for installing catalyst transfer pipes through catalyst transfer ports of a radial-flow reactor during assembly thereof.

BACKGROUND OF THE INVENTION

A wide variety of processes use radial or horizontal flow reactors to effect the contact of particulate matter with a gaseous stream. These processes include hydrocarbon conversion adsorption and exhaust gas treatment. In most of these processes, contact of the particulate material with the fluid decreases the effectiveness of the particulate material in accomplishing its attendant function. In order to maintain the effectiveness of the process, a system has been developed whereby particulate material is semi-continuously withdrawn from the contacting zone and replaced by fresh particulate material so that the horizontal flow of fluidized material will constantly contact particulate material having a required degree of effectiveness. Typical examples and arrangements for such systems can be found in U.S. Pat. No. 3,647,680, U.S. Pat. No. 3,692,496 and U.S. Pat. No. 3,692,496, U.S. Pat. No. 3,706,536, and U.S. Pat. No. 5,130,106.

A good example of the way in which moving bed apparatus has been used for the contacting of fluids and solids is found in the field of petroleum and petrochemical processes especially in the field the hydrocarbon conversion reactions. One such process that uses a radial-flow bed for the contact of solid catalyst particles with a vapor phase reactant stream is found in the dehydrogenation of light paraffins to form olefins. This process uses one or more reaction zones where the catalyst particles enter the top of the reactor and flow downwardly under gravity flow and are transported out of the first reactor. In many cases, a second reactor is located either underneath or next to the first reactor. Catalyst particles again move through the second reactor under gravity flow. After passing through the second reactor, the catalyst particles can go through a further series of reaction zones and are collected and transported to a regeneration vessel for the restoration of the catalyst particles by the removal of coke and other hydrocarbon by-products that are produced in the reaction zone and accumulate on the catalyst. In the dehydrogenation of hydrocarbons using the moving bed system, the reactants typically flow serially through the one or more reaction zones. The dehydrogenation reaction is typically endothermic so the reactant stream is heated before each reaction zone to supply the necessary heat for the reaction. The reactants flow through each reaction zone in a generally horizontal direction through a bed of catalyst. In most cases the catalyst bed is arranged in an annular form so that the reactants flow radially through the catalyst bed. Many other hydrocarbon conversion processes can also be effected with a system for continuously moving catalyst particles under gravity flow through one or more reactors having a horizontal flow of reactants. One such process is the reforming of naphtha. The catalyst particles in each reaction zone are retained between an inlet screen and an outlet screen that together form a vertical bed and allow the passage of vapor through the bed.

Radial-flow reactors typically include a reactor shell with an annular catalyst retention space. Gaseous fluid flows either radially inwardly or outwardly through the annular catalyst retention space to contact the gas with the solid catalyst within the catalyst retention space. The annular catalyst retention space is typically defined by a partition assembly including some type of screened surface. The screened surface is for holding catalyst beds in place and for aiding in the distribution of pressure over the surface of the reactor to facilitate radial flow through the reactor bed. The screen may include, for example a mesh, either wire or other material, or a perforated or punched plate. The screened surface includes an inner screen and an outer screen with the catalyst retention space defined therebetween. For a moving bed, the screen or mesh provides a barrier to prevent the loss of solid catalyst particles while allowing fluid to flow through the bed. In moving bed systems, catalyst particles are typically introduced at the top of the reactor, and flow downward through the catalyst retention space and are removed at the bottom through catalyst removal nozzles or ports. Typically catalyst transfer pipes communicate with the catalyst retention space and extend through the catalyst removal ports to facilitate the flow of the moving bed of catalyst out of the catalyst retention space where it can be transferred to another reactor, regenerated in a regeneration portion of the process, or removed from the system. The screens and the catalyst transfer pipes are preferably constructed of a non-reactive material, but in reality the material often undergoes some reaction through corrosion, and over time problems arise from the corroded screen or mesh.

In order to minimize corrosion of the screens and transfer pipes and damage to the catalyst particles, the catalyst contact surfaces of the screens and catalyst transfer pipes are typically designed to provide a generally smooth surface over which the catalyst particles can flow. For example, in some reactors wires of the screens have a wedge shape with the flat face facing the catalyst retention area for minimal attrition with respect to catalyst particles which are moving downwardly by gravity during use.

Experience has shown that it is difficult to assemble radial flow reactors due to their large sizes and mating parts that preferably fit together with tight tolerance specifications and minimal obstruction or resistance to the flow of catalyst once the reactor is assembled. For example, once a portion of the reactor shell is in place, a crane may be utilized to individually lift lower the outer screen and inner screen into place. The catalyst transfer pipes extend down from the bottom of the partition assembly, usually an outer screen assembly. Crew members guide the transfer pipes into the corresponding catalyst transfer port openings as the screen assembly is lowered. The transfer port openings include annular guides or rings with center openings for centering the catalyst transfer pipes within the catalyst discharge ports. It has been identified that due to the length of the catalyst transfer pipes, they are typically not perfectly straight readily aligned with the catalyst transfer ports. In this regard, during installation the ends of the catalyst transfer pipes often get stuck on the rings, in particular where the rings meet with the inner surface of the ports, so that staff members must manually try to move the transfer pipes to fit through the central openings. Further complicating installation is that installation typically requires installation of several catalyst transfer pipes, which must be centered and lowered at the same time into corresponding ports. For example, sometimes three or four field workers are needed to center the several transfer pipes as the screen assembly is lowered. In this regard, significant amounts of time and man power are required for lowering the screen assemblies into place.

SUMMARY OF THE INVENTION

By one aspect, an apparatus is provided for a radial-flow reactor. The apparatus includes a generally annular partition assembly. At least one catalyst transfer pipe depends from the partition assembly. An end portion of the catalyst transfer pipe is inwardly tapered. By another aspect, a reactor shell portion is provided that includes at least one catalyst transfer port with an opening for receiving the catalyst transfer pipe. The catalyst transfer port includes a centering device with a center opening for centering the transfer pipe with the catalyst transfer port. The centering device includes a tapered upper surface extending at a decline from an inner surface of the catalyst transfer port toward the center opening.

By another approach a method is provided for assembling a radial-flow reactor that includes lowering a partition assembly having at least one transfer pipe depending thereform into a reactor shell portion. The method further includes aligning the transfer pipe with an opening of a corresponding catalyst transfer port of the reactor shell portion. The transfer pipe is lowered through the opening of the corresponding catalyst transfer port and an end portion of the transfer pipe is contacted with a tapered upper surface of a centering device within the opening. The end portion of the transfer pipe is slid along the tapered upper surface to shift the transfer pipe into alignment with and through the center opening of the centering device. By another aspect, a method includes contacting tapered end portions of a plurality of depending transfer pipes with centering devices within the openings of catalyst transfer ports. The method further includes sliding the tapered end portions along surfaces of the centering devices to shift the transfer pipes through center openings of the centering devices.

BRIEF DESCRIPTION OF THE DRAWINGS

FIG. 3 is a cross-sectional view of an end portion of a catalyst transfer pipe positioned in a catalyst transfer port;

FIG. 4 is a partial perspective view of a catalyst transfer port in accordance with various embodiments;

FIG. 5 is a partial perspective view of an end portion of a catalyst transfer pipe in accordance with various embodiments; and FIG. 6 is a cross sectional view of an end portion of the catalyst transfer pipe partially inserted into a catalyst transfer port during assembly.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
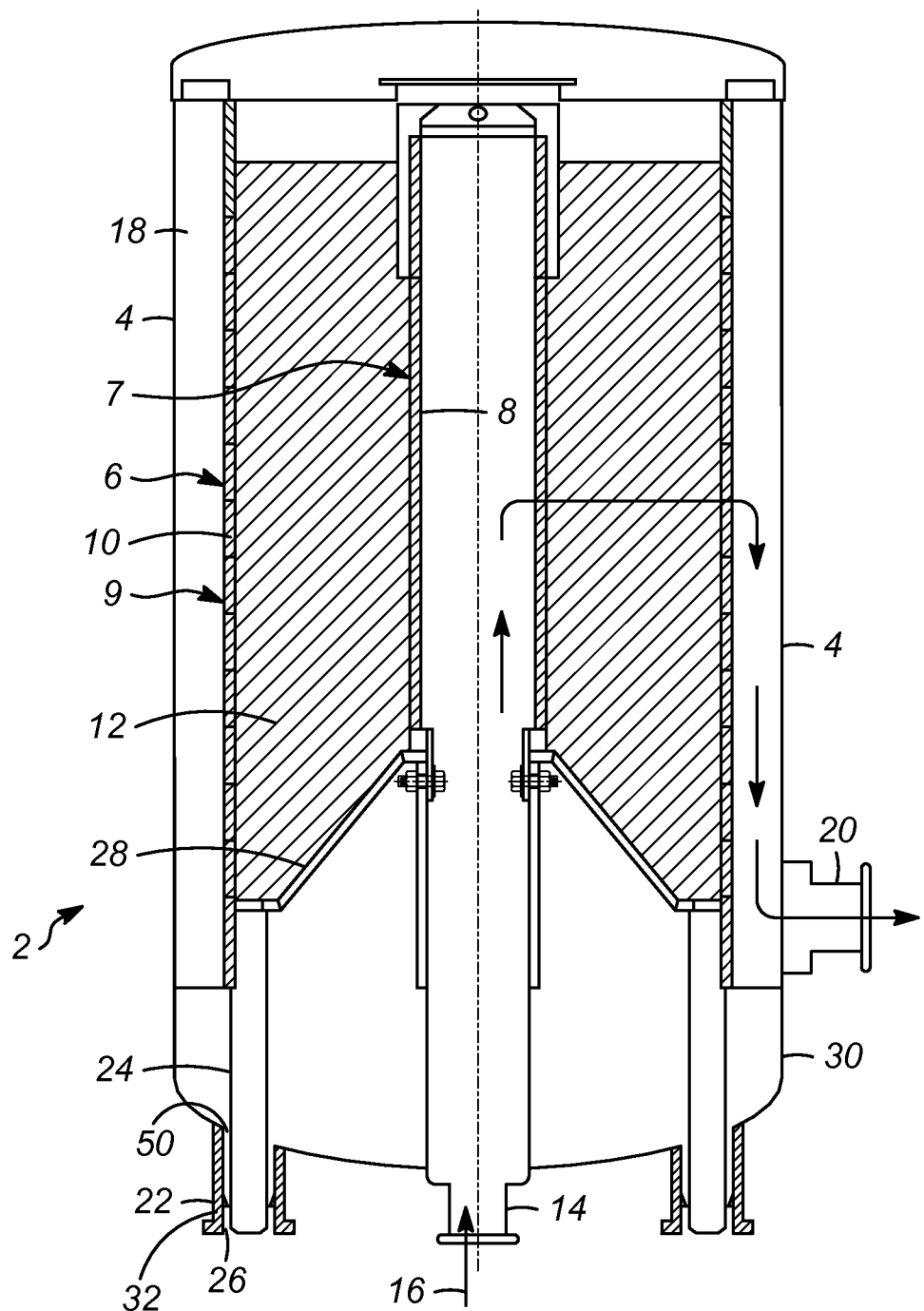
FIG. 1 is a cross-sectional view of a radial-flow reactor system in accordance with various embodiments.
Figure 2:
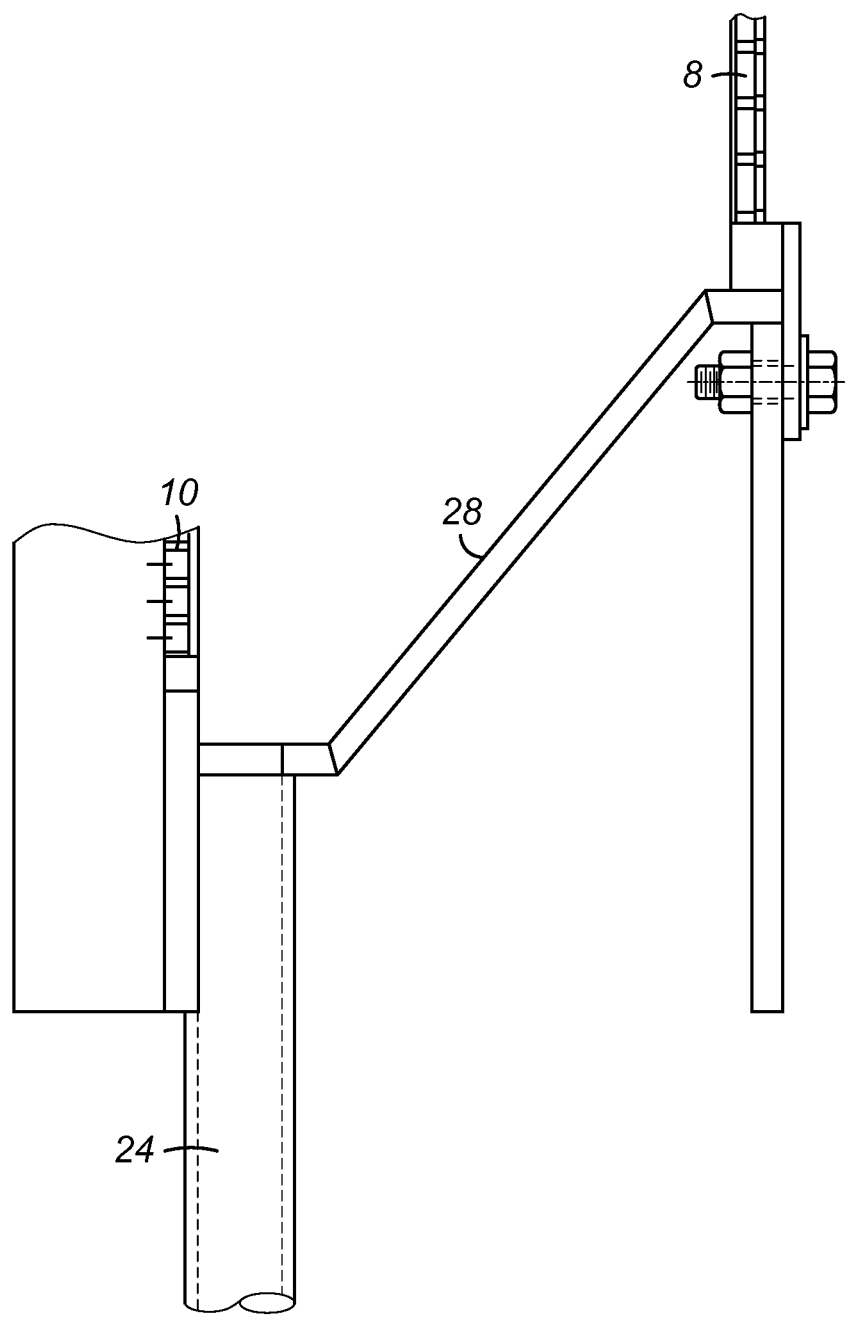
FIG. 2 is a partial cross-sectional view of a portion of a partition assembly in accordance with various embodiments.

The method and apparatus in accordance with various aspects relates to the assembly of a radial-flow reactor. Turning to FIG. 1, a radial-flow reactor 2 in accordance with one aspect is illustrated that includes inner and outer annular partitions for supporting an annular bed of solid material therebetween. The reactor 2 according to one aspect includes a reactor shell 4 and an annular partition assembly 6. The partition assembly 6 may include inner and outer partition assemblies. The partition assembly 6 includes an annular inner partition 8 in the form of an inner screen defining a centerpipe 7 and an annular outer partition 10 in the form of outer screen. An annular catalyst retention space 12 between the inner and outer screens 8 and 10 for retaining a solid particle, or catalyst, is defined by the inner and outer screens 8 and 10 of the partition assembly 6. The reactor 2 by one aspect is configured so that during operation fluid enters the reactor 2 through an inlet 14 at the bottom of the reactor and travels upwardly through the centerpipe 7 in the direction indicated by arrow 16. As the fluid flows upwardly, portions of the fluid shift radially and travel radially through the centerpipe 7, into the catalyst retention space 12, through a catalyst bed contained therein, where the fluid contacts the catalyst and reacts to form a product stream. The product stream flows radially outwardly through the outer partition 10 and into annular space 18 between the outer partition 8 and the reactor shell 4. The product stream is collected in the annular space 18 and passes through a reactor outlet 20.

During operation, the particulate material or catalyst typically flows through the catalyst retention space 12 to provide a moving bed of catalyst. The flow of the catalyst may be assisted by gravity by flowing downwardly through the retention space 12. The catalyst material is subsequently removed through the bottom of the reactor in order to be transferred downstream, regenerated, or discarded. Thus, catalyst transfer ports 22 are provided at the base of the reactor 2 and catalyst transfer pipes 24 extend through the transfer ports 22 in order to provide fluid communication with the catalyst retention space 12 and facilitate the flow of catalyst through the catalyst transfer pipes.

Other configurations of a radial flow reactor are also contemplated herein, such as, for example, the reactor 2 may be configured to have an opposite flow pattern as that illustrated in FIG. 1 such that reactant fluid enters through an inlet into annular space between the reactor shell and the outer partition and flows radially inwardly through the catalyst retention space where it contacts the catalyst and reacts to form a product stream. The product stream flows radially inwardly through the center pipe where it is collected in the centerpipe and exits through the outlet. Other configurations of the reactor and flow are also possible and contemplated herein.

By one aspect, the reactor 2 also includes one or more catalyst transfer ports 22 typically positioned in a bottom portion of the reactor 2 for removing the catalyst from the catalyst retention space 12. One or more corresponding catalyst transfer pipes 24 provide fluid communication with the catalyst retention space 12 and extend through openings 26 of the catalyst transfer ports 22. In this regard, during operation, the catalyst particles are able to flow from the catalyst retention space 12 through the catalyst transfer pipes 24 and exit the reactor 2. There may be one or several of such transfer pipes 24 connected to and depending from the partition assembly 6. The transfer pipes 4 may be attached to a partition assembly 6 including both the inner and outer partitions, or it may be connected to an inner partition assembly 8 or an outer partition assembly 10. In the example illustrated in FIG. 1, a plurality of transfer pipes 24 are attached to and depend from a bottom support wall 28 of an outer partition assembly 6.

During assembly or maintenance of the radial flow reactor 2, a top portion of the reactor 2 is removed and the partition assembly 6 is typically lowered into a bottom portion 30 of the reactor 2. As the partition assembly is lowered, for example the outer partition assembly 10 in FIG. 1, the transfer pipes 24 are aligned with the openings 26 of the corresponding catalyst transfer ports 22 and the transfer pipes 24 are lowered through the openings 26 as the outer partition assembly 10 is lowered into the reactor 2.

In order to center a catalyst transfer pipe 24 within the corresponding catalyst transfer port opening 26 centering devices 32 are provided within the catalyst transfer port openings 26. As illustrated in FIGS. 3-4, by one aspect the centering device 32 may include a centering ring 34 having a center opening 36 through which the catalyst transfer pipes 24 may be inserted and held. Unless otherwise specificed, center opening refers to a generally central opening of the centering device or ring and is not necessarily perfectly centered in the centering device. By one aspect, the centering ring 34 includes a tapered upper surface 38 that extends from an inner wall portion 40 of the catalyst transfer port 22 toward the center opening 36. The centering ring tapered upper surface 38 extends at an angle below a radial axis 42 of the transfer pipe 24 so that during installation a bottom portion of the catalyst transfer pipe 24 can contact the tapered upper surface 38. As the transfer pipe is further lowered into the opening 26 the bottom portion 46 is biased inwardly toward the center opening 36 as it slides along the tapered upper portion 38 of the centering ring 34 until it is generally aligned with the center opening 36. At this point, the transfer pipe 24 may pass through the center opening 36 and be inserted fully into position within the catalyst transfer port 22. In this manner, the catalyst transfer pipe 24 can be installed without becoming obstructed by an upper surface of the centering ring, which would otherwise require an operator to manually shift the transfer pipe into place. As this would otherwise have to be done for each of the transfer pipes, the time and effort required to install the transfer pipes into the catalyst transfer ports is significantly reduced.

By one aspect, the tapered upper surface 38 of the centering device 32 includes a generally flat surface extending from an inner wall 40 of the catalyst transfer port 22 toward the center opening 36. In one example, the tapered upper surface 38 may be declined at an angle greater than about 10 degrees below the radial axis 42 of the transfer port 22 or transfer pipe 24, by another example between about 20 degrees and about 70 degrees below the radial axis 42 of the transfer pipe 24 or transfer port 22, by another example between about 30 and about 60 degrees below the radial axis 42 of the transfer pipe 24 or transfer port 22, and by yet another example between about 40 degrees and about 50 degrees below the radial axis 42 of the transfer pipe 24 or transfer port 22. As used herein, radial axis 42 refers to an axis perpendicular to the longitudinal axis 44 of the transfer pipe 24 and/or the catalyst transfer port 22. For simplicity, FIG. 3 is illustrated with the catalyst transfer pipe aligned within the catalyst transfer port 22 such that the longitudinal axes and radial axes are aligned and both designated respectively as 44 and 42. However, it should be understood that in practice, these axes may not be aligned during assembly and/or when the transfer pipe 24 is in an operative position within the transfer port 22. Preferably the portion of the tapered upper surface 38 adjacent to the transfer port inner wall 40 is also provided at the declined angle to avoid the catalyst transfer pipe 24 getting caught between the tapered upper surface 38 and the catalyst transfer port inner wall 40 during installation.

Other configurations for the centering device 32 are contemplated herein, such as providing a non-circular opening, such as, but not limited to a square, triangular rectangular, trapezoidal shaped centering device having inclined or tapered upper surfaces. Further, the tapered upper surfaces may include surfaces other than flat surfaces as illustrated in FIGS. 3-6. For example, rounded upper surfaces having a generally declining tangent extending from the catalyst transfer port inner surface to the central opening may also be provided. In this regard, an imaginary line tangential to the upper surface is greater than about 15 degrees below the radial axis 42 of the transfer port 22 in one example, between about 30 degrees and about 60 degrees below the radial axis of the transfer port 22 in another example, and between about 40 degrees and about 50 degrees below the radial axis of the catalyst transfer port 22 in yet another example.

By one aspect, inwardly tapered end portions 46 of the one or more catalyst transfer pipes 24 are provided to assist with aligning the catalyst transfer pipes 24 with the center openings 36 of the centering devices 32 so they can be inserted through the center openings 36. As illustrated in FIG. 3, the catalyst transfer pipe 24 may include an elongate generally hollow annular tube, although other cross-sectional hollow tube geometries are contemplated herein, such as, but not limited to, square, rectangular, trapezoidal, an triangular. The end portion 46 of the catalyst transfer pipe 24 is tapered at an acute angle relative to the longitudinal axis 44 of the transfer pipe 24 to provide an inclined contact surface 48 for contacting and sliding along the catalyst transfer port 22 and/or the centering ring 34 therein. In one example, the tapered end portion 46 has an inwardly tapered surface 48 at an angle of between about 10 degrees and about 80 degrees relative to the longitudinal axis 44 of the transfer pipe 24, between about 30 degrees and about 60 degrees relative to the longitudinal axis 44 of the transfer pipe 24 in another example, and between about 40 degrees and about 50 degrees relative to the longitudinal axis 44 of the transfer pipe 24 in yet another example. In this manner, by providing a tapered end portion 46 of the catalyst transfer pipe, obstruction of the catalyst transfer pipe during installation thereof into the catalyst transfer port can be minimized to provide for easier and improved alignment and installation.

In one approach, the end portion 46 of the catalyst transfer pipe 24 includes a beveled end portion as illustrated in FIG. 3. By beveling the end portion of the catalyst transfer pipe 24 and maintaining a generally constant internal diameter thereof, the tapered end portion 46 of the catalyst transfer pipe 24 does not interfere with the flow and removal of catalyst through the transfer pipe 24, by, for example, creating a restriction to the flow therethrough.

By one aspect a method is provided for assembling a radial-flow reactor 2 as described herein. The method includes lowering the partition assembly 6 with at least one transfer pipe 4 depending therefrom into a bottom portion 30 of the reactor shell. End portions 46 of the transfer pipes 24 are then aligned with openings 26 of the corresponding catalyst transfer ports 22 of the reactor lower shell portion 30. According to various aspects, where the catalyst transfer pipes 24 include tapered end portions 46, the tapered surfaces 48 may slide along upper edge portions 50 of the catalyst transfer ports 22 to shift the transfer pipes 24 into alignment with the catalyst transfer port openings 26. The partition assembly 6 is further lowered so that the transfer pipe 24 is lowered through the opening 26 of the corresponding catalyst transfer ports 22 until the transfer pipe end portion 46 contacts the upper surface 38 of the centering device 32. The tapered end portion 46 then slides along the centering device upper surface 38 to shift the transfer pipe 24 into alignment with and through the center opening 36 of the centering device 32.

Where the centering device includes a tapered upper surface 38, catalyst transfer pipe 24 is lowered until the end portion 46 thereof contacts the tapered upper surface 38 of the centering device 32. The catalyst transfer pipe 24 may then be lowered further so that the end portion 46 slides along the tapered surface 38 to shift the transfer pipe 24 into alignment with and through the center opening 36 of the centering device 32.

By one preferred aspect, as illustrated in FIGS. 3-6, both the centering device 32 and the transfer pipe end portion 46 may be tapered such that the transfer pipe tapered end portion 46 contacts and slides along a tapered upper surface 38 of the centering device 32 to shift the catalyst transfer pipe 24 into alignment with and through the center opening 36, as illustrated in FIG. 6.

As a plurality of such transfer pipes 24 may be provided, as described above, various methods of assembly may include inserting a plurality of transfer pipes 24 into corresponding catalyst transfer ports 22 in the manner described above. Further, the transfer pipes 24 may be configured to resiliently shift relative to the partition assembly 6 and/or relative to each other during installation, such that the transfer pipes 24 may be installed through corresponding catalyst transfer ports 22 even where all of the transfer pipes 24 do not initially align with the corresponding catalyst transfer ports 22. This alignment may occur automatically to two or more of the transfer pipes during lowering of the assembly 6 into place.

The above description and examples are intended to be illustrative of the invention without limiting its scope. While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

The invention claimed is:

1. An apparatus for a radial-flow reactor, comprising:
    a generally annular partition assembly;
    at least one elongate catalyst transfer pipe depending from the partition assembly; and
    an inwardly tapered end portion of the catalyst transfer pipe.

2. The apparatus of claim 1, wherein the catalyst transfer pipe has a generally annular cross-section.

3. The apparatus of claim 1, wherein the catalyst transfer pipe has a generally constant inner diameter along a length thereof.

4. The apparatus of claim 1, wherein the catalyst transfer pipe tapered end portion is tapered at an angle of between about 30 degrees and about 60 degrees relative to a longitudinal axis of the catalyst transfer pipe.

5. The apparatus of claim 1, wherein the catalyst transfer pipe tapered end portion includes a beveled edge.

6. The apparatus of claim 1, further including a reactor shell portion including a lower catalyst transfer port with an opening therethrough for receiving the transfer pipe and a centering device within the catalyst transfer port opening for centering the catalyst transfer pipe within the catalyst transfer port.

7. The apparatus of claim 6, wherein the centering device includes a tapered upper surface extending at a decline from an inner surface of the catalyst transfer port toward the center opening.

8. The apparatus of claim 7, wherein the tapered upper surface is declined at an angle of at least about 15 degrees below a radial axis of the transfer pipe.

9. The apparatus of claim 7, wherein the tapered upper surface is declined at an angle of between about 30 degrees and about 60 degrees below a radial axis of the transfer pipe.

10. An apparatus for a radial-flow reactor, comprising
    a reactor shell;
    a bottom portion of the reactor shell having a catalyst outlet port with an opening therethrough for removal of catalyst;
    a centering device in the opening of the catalyst outlet port having a center opening for receiving a catalyst transfer pipe therethrough; and
    a tapered upper surface of the centering device extending at a decline from an inner surface of the catalyst outlet port opening toward the centering device center opening.

11. The apparatus of claim 10, wherein the centering device includes a centering ring with a generally annular shape.

12. The apparatus of claim 10, wherein the centering device includes a generally triangular cross-section and the tapered upper surface includes one side of the triangular cross-section.

13. The apparatus of claim 10, wherein the tapered upper surface extends at a declined angle of at least about 15 degrees below a radial axis of the catalyst transfer port.

14. The apparatus of claim 10, wherein the tapered upper surface extends at a declined angle of between about 30 degrees and about 60 degrees below a radial axis of the catalyst transfer port.

15. The apparatus of claim 10, further comprising a partition assembly and a catalyst transfer pipe depending from the partition assembly for being positioned within the centering device.

16. The apparatus of claim 15, further comprising an inwardly tapered end portion of the catalyst transfer pipe.

17. The apparatus of claim 16, wherein the inwardly tapered end portion includes a beveled edge of the catalyst transfer pipe end portion.

* * * * *